(12) United States Patent
Ehlert et al.

(10) Patent No.: US 11,850,894 B2
(45) Date of Patent: Dec. 26, 2023

(54) AGRICULTRAL PRIME MOVER AND SYSTEM AND METHOD FOR OPERATING AN AGRICULTURAL PRIME MOVER

(71) Applicant: CLAAS Tractor SAS, Vélizy-Villacoublay (FR)

(72) Inventors: Christian Ehlert, Bielefeld (DE); Jan Carsten Wieckhorst, Paderborn (DE); Christian Birkmann, Versmold (DE); Robin Schütte, Büren (DE); Ralf Müller, Schönbeck/OT Pretzien (DE)

(73) Assignee: CLAAS Tractor SAS, Vélizy-villacoublay (FR)

( * ) Notice: Subject to any disclaimer, the term of this patent is extended or adjusted under 35 U.S.C. 154(b) by 369 days.

(21) Appl. No.: 17/158,648

(22) Filed: Jan. 26, 2021

(65) Prior Publication Data

US 2021/0237520 A1    Aug. 5, 2021

(30) Foreign Application Priority Data

Jan. 30, 2020   (DE) .......................... 102020102330.8

(51) Int. Cl.
*G06F 17/00*         (2019.01)
*B60C 23/00*         (2006.01)

(52) U.S. Cl.
CPC ....... *B60C 23/002* (2013.01); *B60Y 2200/221* (2013.01)

(58) Field of Classification Search
CPC .............. B60C 23/002; B60C 2200/08; B60Y 2200/221

(Continued)

(56) References Cited

U.S. PATENT DOCUMENTS 4,330,156 A * 5/1982 Gurries ................... E02F 5/326
                                                    299/37.2
6,144,910 A * 11/2000 Scarlett ................ A01B 63/023
                                                    701/50

(Continued)

FOREIGN PATENT DOCUMENTS

DE          10336330 B3    1/2005
DE       102011085040 A1   4/2013

(Continued)

OTHER PUBLICATIONS

Adjust Tire Inflation Pressure on the Go (Year: 2015).*
European Search Report issued in related Application No. EP 20200733, dated Feb. 11, 2021 (7 pages).

*Primary Examiner* — Ronnie M Mancho
(74) *Attorney, Agent, or Firm* — Lempia Summerfield Katz LLC

(57) ABSTRACT

A prime mover, such as a tractor, is disclosed. The prime mover includes a drivetrain, a driver assistance system, and a tire pressure control system. The tire pressure control system is equipped with pneumatic components for setting and adapting a tire pressure of at least one of the tires of the prime mover and an attachment to the prime mover. The drivetrain includes at least one drive motor, one gearbox, at least one power take-off, and at least one ancillary unit. The driver assistance system controls the tire pressure control system and includes a computing unit, a memory unit, and an input/output unit. In particular, the driver assistance system includes an automatic tire pressure controller that operates based on a characteristic curve and is configured for optimized control of the tire pressure control system depending on selectable control strategies and/or optimization target variables.

20 Claims, 5 Drawing Sheets

(58) Field of Classification Search
USPC .......................................................... 701/50
See application file for complete search history.

(56) References Cited

U.S. PATENT DOCUMENTS

| | | | |
|---|---|---|---|
| 9,873,296 B2* | 1/2018 | Wieckhorst | B60C 23/002 |
| 10,131,191 B2* | 11/2018 | Vervaet | B60C 23/002 |
| 10,407,045 B2* | 9/2019 | Kneitz | B60K 28/16 |
| 10,433,473 B2* | 10/2019 | Wieckhorst | A01B 63/112 |
| 2016/0039480 A1* | 2/2016 | Pichlmaier | A01B 63/1145 |
| | | | 180/233 |
| 2017/0086348 A1* | 3/2017 | Schleyer | A01B 63/10 |
| 2017/0253093 A1 | 9/2017 | Baum | |
| 2018/0084709 A1 | 3/2018 | Wieckhorst | |
| 2018/0084722 A1 | 3/2018 | Wieckhorst | |
| 2018/0244257 A1* | 8/2018 | Kneitz | B60K 6/448 |
| 2019/0128690 A1 | 5/2019 | Madsen | |
| 2020/0077561 A1* | 3/2020 | Wieckhorst | A01B 69/004 |
| 2021/0163005 A1* | 6/2021 | Ehlert | B60W 10/06 |
| 2021/0237520 A1* | 8/2021 | Ehlert | B60C 23/002 |
| 2022/0000006 A1* | 1/2022 | Wieckhorst | A01B 59/042 |

FOREIGN PATENT DOCUMENTS

| | | | | |
|---|---|---|---|---|
| DE | 102011085040 A1 * | 4/2013 | | A01B 63/112 |
| DE | 102011085041 A1 | 4/2013 | | |
| DE | 102013106548 A1 | 12/2014 | | |
| DE | 202019102183 U1 | 5/2019 | | |
| DE | 102020102330 A1 * | 8/2021 | | B60C 23/002 |
| DE | 102020117674 A1 * | 1/2022 | | A01B 59/067 |
| DE | 102021120813 A1 * | 2/2023 | | A01B 63/1115 |
| EP | 3300978 A1 | 4/2018 | | |
| EP | 3305053 A1 | 4/2018 | | |
| EP | 3305053 A1 * | 4/2018 | | A01B 63/00 |
| EP | 2997805 B1 * | 10/2018 | | A01B 67/00 |
| EP | 3305053 B1 | 4/2021 | | A01B 63/00 |
| EP | 2818337 B1 * | 5/2021 | | A01B 63/112 |
| EP | 3932158 A1 * | 1/2022 | | A01B 59/067 |
| WO | WO-2009149705 A2 * | 12/2009 | | E01H 1/042 |

* cited by examiner

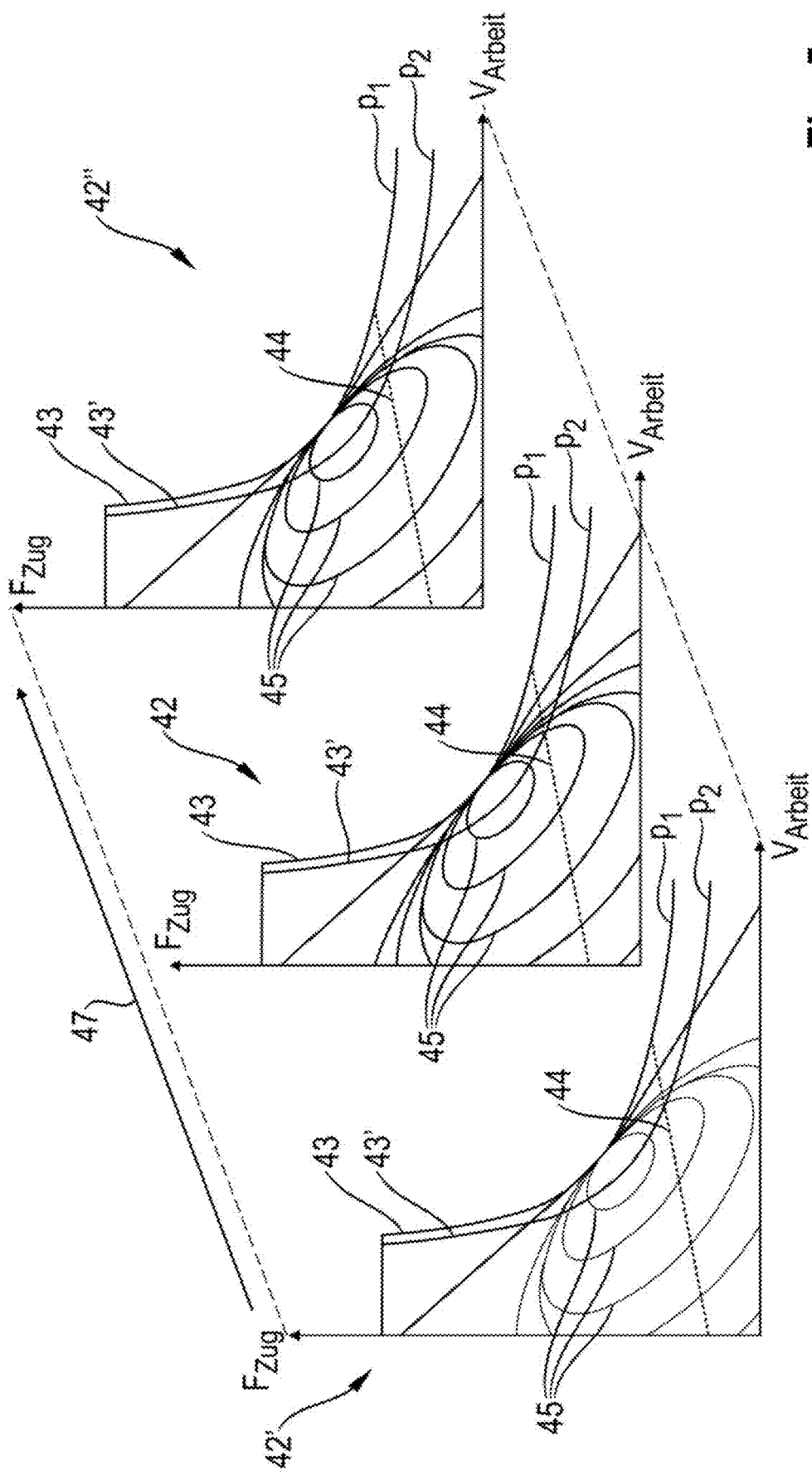

AGRICULTRAL PRIME MOVER AND SYSTEM AND METHOD FOR OPERATING AN AGRICULTURAL PRIME MOVER

CROSS REFERENCE TO RELATED APPLICATION

This application claims priority under 35 U.S.C. § 119 to German Patent Application No. DE 102020102330.8 (filed Jan. 30, 2020), the entire disclosure of which is hereby incorporated by reference herein.

TECHNICAL FIELD

The invention relates to an agricultural prime mover and a method for operating an agricultural prime mover.

BACKGROUND

An agricultural prime mover (interchangeable termed a prime mover), such as a tractor or the like, may be equipped with a tire pressure control system of various configurations to enable an operator of the agricultural prime mover to set a desired tire pressure (alternatively termed an internal tire pressure or an inner tire pressure). As is known, the agricultural prime mover may be adapted to a particular intended purpose by selecting a suitable tire pressure. For example, an agricultural prime mover may be operated on or in the field with a lower tire pressure than used when operating the agricultural prime mover on or in road travel in order to minimize the soil load and therefore the soil compression in field travel from an increased contact area (with the tires of the agricultural prime mover operating at low or lower tire pressure) and in order to increase the traction effectiveness. Conversely, fuel may be saved when operating the agricultural prime mover in road travel (with the tires of the agricultural prime mover operating at high or higher tire pressure) by a decreased rolling resistance between the tires and ground.

US 20170253093 A1 discloses a tire pressure system that includes a control unit which calculates a set pressure value to be maintained for the tire pressure and adjusts the calculated set pressure value in dependence on an operating state classification derived from operating state parameters of the vehicle system.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein:

FIG. 5 shows an example of an initial characteristic map that is adapted based on a change to an operating parameter in the prime mover.

DETAILED DESCRIPTION

Figure 1:
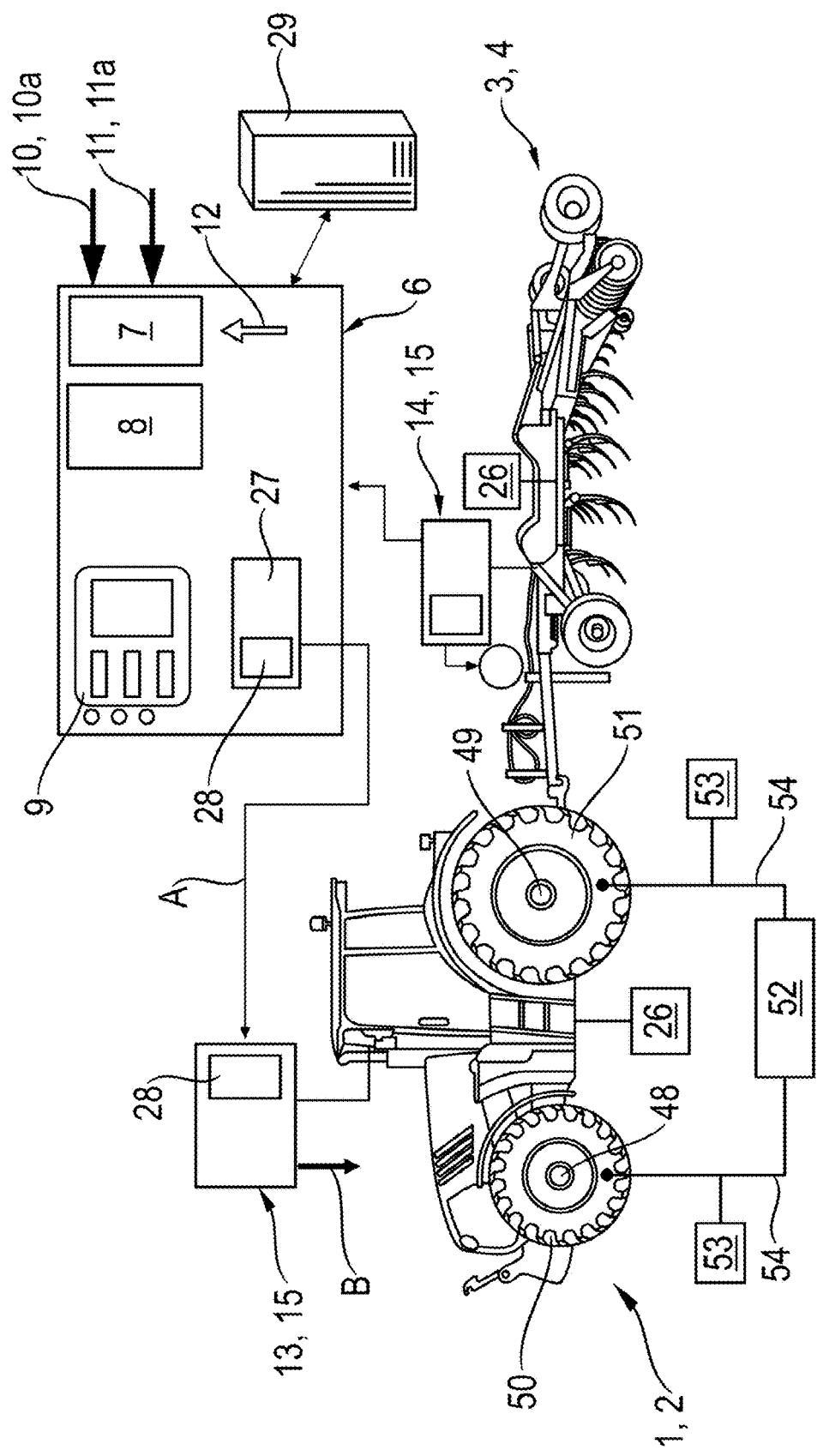
FIG. 1 shows a schematic representation of a prime mover and an attachment adapted to the prime mover.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

In spite of the presence of known tire pressure control systems, and accordingly the technical option of adjusting a desired tire pressure, it may still be difficult for the operator to select a tire pressure that is actually suitable for the particular intended purpose. For example, to select the tire pressure suitable for a specific intended purpose, numerous different factors may be taken into account that may also change during a job or task performed by the prime mover. Moreover, the selected tire pressure should not exceed a so-called tire load capacity limit that is specified by the tire manufacturer. The tire load capacity limit may be termed the minimum permissible tire pressure that is permissible for a specific wheel load and a driving speed of the prime mover.

One manner to monitor the tire pressure is with a tire pressure control system that uses an operating state classification derived from operating state variables, such as the nature of the traveled ground surface to distinguish between road travel and field travel. The derived operating state classification may be saved in a geo-referenced manner in order to retrieve the corresponding operating state classification upon recognizing a new vehicle system approach of the saved geo-position, and to correspondingly adapt the tire pressure predictively and automatically by controlling the tire pressure control system. In this context, the tire pressure control system determines whether the agricultural prime mover is traveling on the road or the field, and accordingly adjusts the tire pressure accordingly to improve operation (e.g., a higher tire pressure may be set for fuel-saving operation of the prime mover in road travel, and/or a lower tire pressure is set for soil-friendly operation in field travel).

In one or some embodiments, the agricultural prime mover better recognizes the complex relationships in setting and adapting the tire pressure of the prime mover. In particular, a prime mover, such as a tractor, includes a drivetrain, a tire pressure control system, and a driver assistance system. The drivetrain comprises any one, any combination, or all of: at least one drive motor; at least one gearbox; at least one power take-off; and at least one ancillary unit. The tire pressure control system includes one or more pneumatic components configured to one or both set or adapt a tire pressure of at least one tire of the agricultural prime mover or at least one attachment adapted to the agricultural prime mover. And, the driver assistance system is configured to control the tire pressure control system, with the driver assistance system comprising an automatic tire pressure controller configured to: access one or both of one or more selectable control strategies or one or more optimization target variables; determine, based on a characteristic curve and the one or both of one or more selectable control strategies or one or more optimization target variables, at least one control aspect of the tire pressure control system; and command the at least one control aspect of the tire pressure control system. The driver assistance system may include a computing unit, a memory unit, and an input/output unit.

In this way, the driver assistance system assists the operator of the prime mover to achieve optimization of the tire pressure control system by selecting a control strategy (from a plurality of available control strategies) and/or one or more optimization target variables without more extensive knowledge of the operating behavior of the tires at different inner or internal pressures and different operating conditions of the prime mover. In so doing, some or all of the relationships may be considered by the automatic tire pressure controller that works based on a characteristic curve which influence the control strategy, or respectively the optimization target variable(s).

Merely by way of example, selectable control strategies may include efficiency or performance. Responsive to selecting the control strategy efficiency, the automatic tire pressure controller is configured to automatically ascertain the tire pressure that leads to maximum traction efficiency for the currently prevailing traction conditions. To accomplish this, the influential variables of the drivetrain may also be detected that are then considered in determining the optimum tire pressure. These influential variables are, inter alia, the efficiency characteristic of the components belonging to the drive train. Advantageously, various aspects of efficiency, such as dispersions of efficiencies and/or varying operating behavior of the components of the prime mover and attachment and changes in the environmental conditions that occur in operating practice, may be considered by the automatic tire pressure controller. The automatic tire pressure controller that operates based on a characteristic curve may consider or take into account one, some, or all influential variables of the overall system that may include one or both of the prime mover and attachment. In particular, the dispersions of efficiencies that occur in practice and/or the operating behavior of the chassis of the prime mover may be considered by the automatic tire pressure controller.

In one or some embodiments, the overall system may comprise (or consist of) the prime mover with the drivetrain and an adapted attachment may be comprehensively optimized on the basis of an automated adjustment of the tire pressure in order to ensure operation that is adapted to the particular operating situation. As discussed further below, various parts of the driver assistance system, such as any one, any combination, or all of the computing unit, the memory unit, and the input/output unit, may be spatially separate from each other (e.g., they need not be arranged together on the prime mover).

The term "control strategy" may describe a superordinate specification of an operating mode of the prime mover without a specification by selecting one or more control variables. The term "optimization target variable" may describe a specific target position while specifying one or more control variables that are to be achieved by controlling the drivetrain by the automatic tire pressure controller. The particular optimization target variable may represent a specific subsection of the control strategy whose adaptation is undertaken to achieve and maintain the control strategy.

A drive motor of the drivetrain may be designed as an internal combustion engine. The drivetrain may additionally comprise another drive motor that, for example, is designed as an electric motor. The gearbox may be designed as a power shift gearbox or continuously variable gearbox. An engine fan, a hydraulic pump, or an electric generator, for example, may form an ancillary unit of the drivetrain. Moreover, devices for accommodating the attachment, such as a front and/or rear power lift, may form an ancillary unit that is driven by the drivetrain. For example, a PTO shaft may be considered a power take-off shaft that may serve to drive the attachment.

The attachment for the prime mover may, for example, be designed as a transport trailer, loading vehicle, windrow, tedder, mower, baler, tillage machine such as a grubber or plow, sprayer, or manure spreader.

Accordingly, the tire pressure control system and the driver assistance system may form the automatic tire pressure controller in that, to implement the selected control strategy and/or optimization target variable, the computing unit is configured to autonomously ascertain the parameters influencing the tire pressure to be set and specify them to the tire pressure control system (e.g., the computing unit sends a command to the tire pressure control system to set or adjust at least one aspect of its operation). The computing unit may ascertain the parameters to be used that influence the tire pressure to be set by the tire pressure control system based on the selection of one of the control strategies and/or optimization target variables that are saved in the memory unit of the driver assistance system. With the disclosed automatic tire pressure controller, the operator may specify a single selection (such as one or both of the control strategy or optimization target variable(s)), in turn specifying the manner of controlling the tire pressure control system. More specifically, the driver need not enter anything further in order to ascertain or determine the setting of the parameters of the tire pressure control system that may influence the tire pressure since they are entered autonomously by the automatic tire pressure controller. However, the operator may, for example, change the selected control strategy and/or an optimization target variable as desired such that the automatic tire pressure controller may still autonomously control the tire pressure control system, though with a different priority as desired by the operator.

As discussed above, various control strategies are contemplated. As one example, the selectable control strategy may comprise at least a control strategy of one or both of "efficiency" or "performance". With the control strategy of "efficiency", an optimization of fuel consumption per unit area is performed, wherein the operating point in the n-dimensional characteristic map lies near the least possible fuel consumption, taking into account the parameters of the drivetrain. With the control strategy of "performance", an optimization of output per area is performed, wherein the operating point in the n-dimensional characteristic map lies near the maximum output per area, taking into account the parameters influencing the tire pressure to be set. To accomplish this, the tire pressure may be varied taking into account the other parameters influencing the system efficiency, in particular the parameters of the drivetrain corresponding to the particular selected control strategy or optimization target variable.

Further, various optimization target variables are contemplated. Merely by way of example, the optimization target variables may include any one, any combination, or all of: "output per area"; "consumption per area"; "yield per area"; "cost per area"; or "work quality". The optimization target variable of "cost per area" may, for example, primarily include a cost metric, such as any one, any combination, or all of: accruing personnel costs; fuel costs; wear costs; operating hours; etc. The optimization target variable of "performance per area" may, for example, primarily concern increasing the worked area and/or processed bulk of agricultural goods. The optimization target variable of "work quality" may prioritize, for example, the admixture of crop residue, crumbling, reconsolidation, feed quality, etc. in controlling the drivetrain.

In one or some embodiments, the automatic tire pressure controller may be configured to optimize the traction efficiency of the prime mover depending on the selected control strategy and/or optimization target variable. In particular in field driving, the automatic tire pressure controller may automatically ascertain and adaptation the tire pressure may control the tire pressure control system to set the maximum or optimum traction efficiency for the currently prevailing traction conditions, accounting for the tire load capacity. The term "field travel" may also include work travel by the prime mover that is to be performed for example on a silo or another subsurface that does not have a solid surface.

In one or some embodiments, the automatic tire pressure controller may be configured to optimize the tire pressure for any one, any combination, or all of: a specific wheel; a specific axle; or overall. This may allow for maximum flexibility in the automatic tire pressure controller to realize the selected control strategy and/or optimization target variable.

In so doing, various parameters may be considered for optimized controlling of the tire pressure control system, such as any one, any combination, or all of: the operating parameters of the prime mover; the operating parameters of the drivetrain; the operating parameters of the attachment; or environmental parameters resulting from the environmental conditions. In one or some embodiments, at least the operating parameters of the drivetrain and the attachment are incorporated in the optimized control since they may at least be directly ascertained in the prime mover or the attachment. Alternatively, or in addition, the automatic tire pressure controller may detect, determine, or receive environmental parameters, thereby permitting the automatic tire pressure controller to draw conclusions about the currently prevailing conditions of the soil on which the prime mover and the adapted attachment are moved.

In one or some embodiments, sensor apparatuses may be arranged at least on the prime mover that serve to determine operating parameters and/or environmental parameters. One of the sensor apparatuses may, for example, be any one, any combination, or all of: a rotational speed sensor; a torque sensor; a pressure sensor; or a force sensor. The sensor apparatus(es) for determining operating parameters of the prime mover may be assigned directly to the drivetrain and its components such as the power take-off or ancillary units. Moreover, additional sensor apparatuses may be assigned to the prime mover and/or the attachment that are configured to determine operating information or operating parameters of the prime mover and/or the attachment, as well as to determine and/or receive environmental parameters. One of the sensor apparatuses, may, for example be any one, any combination, or all of: a speed sensor; a tilt sensor; an optical sensor; or a positioning sensor. Using the tilt sensor, a tilt of the prime mover and/or the attachment may be detected in the longitudinal and/or transverse direction. This allows the prevailing topology in the particular operating situation to be inferred. This operating information may optionally be supplemented and/or verified by data provided by the positioning sensor.

In particular, the operating parameters of the drivetrain and/or the attachment may include any one, any combination, or all of: the output power of the at least one drive motor; the output power of the gearbox or the gearbox load; the drive power of the at least one ancillary unit; or any one, any combination, or all of power take-off, the slip, the driving speed, the gearbox ratio, the power flow in the hydraulic drive chain, the attachment type or setting parameters of the attachment.

Moreover, a functional model of the prime mover and the attachment may be saved in the memory unit that depicts at least part of the functional relationships of the prime mover and the attachment. Accordingly, the various operating situations of the prime mover and/or the adapted attachment may be modeled using the functional model in order to achieve improved or optimized controlling of the tire pressure control system by the automatic tire pressure controller in the particular operating situation and taking into account the chosen control strategy and/or optimization target variable(s). Alternatively contemplated are pure black box models that, for example, are based on artificial intelligence (AI), neural networks, or mixed forms of AI and neural networks in order to depict at least part of the functional relationships of the drivetrain.

In one or some embodiments, at least one n-dimensional characteristic map may be assigned to the operating parameter of the tire pressure to depict the functional relationships of the prime mover, wherein the tire pressure is defined as the output variable of the at least one n-dimensional characteristic map. Using the at least one n-dimensional characteristic map, even complex functional relationships of the overall system comprising (or consisting of) the prime mover, attachment and surroundings may be depicted with little or less computing effort. Characteristic curves of the n-dimensional characteristic map may be adapted adaptively to the particular situation in order to take into account some or all relationships in the operation of the prime mover, attachment and environmental conditions that have an influence on the control strategies, and on the optimization target variable(s), and therefore on the required setting of the tire pressure. The characteristic curves of the n-dimensional characteristic curve may be adapted by the automatic tire pressure controller.

In so doing, at least one or more operating parameters of any one, any combination, or all of the prime mover, the attachment and environmental parameters resulting from the environmental conditions may be the input variables of the at least one n-dimensional characteristic map. Accordingly, the operating parameters of the output power of at least one drive motor, output power of the gearbox, gearbox load, drive power of the at least one ancillary unit and/or the at least one power take off, slip, power flow of the PTO train, and/or power flow in the hydraulic drivetrain and/or an electrical drivetrain may be provided as the input variables. Other input variables may include the tire size and tire type that are arranged on the axles of the prime mover, as well as wheel forces transmitted by the tires to the soil. Inter alia, any one, any combination, or all of the soil nature, soil type, soil state, soil moisture, or the particular topography may be the environmental parameters as the input variable.

These environmental parameters may be equally taken into account as input variable(s) in field travel as well as in road travel.

In one or some embodiments, the computing unit may select the at least one n-dimensional characteristic map depending on the selected control strategy and/or optimization target variable(s) and may be based on the ascertainment of the tire pressure. To control the tire pressure control system, a basic output may thereby be provided in order to achieve the envisioned results that are to be attained by selecting the control strategy and/or the optimization target variable(s) without requiring additional effort or input by the operator.

In one or some embodiments, the computing unit may match the at least one n-dimensional characteristic map during operation, such as cyclically, periodically, or responsive to detection of a changed condition(s) of use of the prime mover and/or the attachment, with the condition(s) of use of the prime mover and/or the attachment, such that at least one n-dimensional initial characteristic map is saved in the memory unit, and during the initial ascertainment of the tire pressure, the computing unit may perform the ascertainment or determination based on the initial characteristic map. In particular, during initial determination of the tire pressure, the agricultural prime mover may perform the initial determination of the tire pressure based on the initial characteristic map.

In so doing, the computing unit may be configured to adapt the form of the initial characteristic map to existing conditions of use by using measured operating parameters of at least the prime mover and/or the attachment, or approaching sampling points in the initial characteristic map. In addition, measured, received, or otherwise determined environmental parameters may be used in order to adapt the form of the initial characteristic map to existing conditions of use. If measured parameters are missing in the n-dimensional space of the initial characteristic map or only exist to an insufficient extent and they are not approached in the standard operation of the prime mover, sampling points may be approached instead. Starting from the initial characteristic map, the form of the characteristic map may be adapted to the current conditions of use by adjusting predefined operating points that represent sampling points in the characteristic map.

While the prime mover is operating, the precise form of the at least one n-dimensional characteristic map may be adapted to the current conditions of use by ascertaining at least one of the parameters plotted in the n-dimensional characteristic map. When the prime mover is in working mode (e.g., in field travel or road travel), the conditions of use may be subject to strong fluctuations which can be detected and considered promptly by the automatic tire pressure controller in order to improve or optimize operation according to the chosen control strategy and/or the chosen optimization target variable(s). In one or some embodiments, promptly means that the automatic tire pressure controller reacts to changes within a time interval depending on the operating variables and reaction time of the tire pressure control system in order to cause a change in the tire pressure.

The knowledge of the n-dimensional characteristic map makes it possible for the automatic tire pressure controller to automatically set the internal tire pressure to adjust the tire pressure for a specific wheel, and/or axle, and/or overall so that the tire pressure is optimized corresponding to the particular control strategy and/or optimization target variable(s). In this case, the tire pressure forms the manipulated variable.

Moreover, a driver assistance system, with an automatic tire pressure controller, may be configured with the functionality described herein for use in a prime mover. In this case, the driver assistance system may be designed based on a data cloud service. For example, information generated from various sources, such as by any one, any combination, or all of the sensor apparatuses of the prime mover, the attachment, or the external information may be transmitted to the cloud service and processed there using an algorithm. The processed data may then be sent to the automatic tire pressure controller as the data for transmission, depending on which control strategy is selected. Alternatively or in addition, the external computer unit may prepare data, in particular external information from service providers, using an algorithm, and may transmit to the automatic tire pressure controller the prepared data as the data to be transmitted, depending on which control strategy is selected.

Moreover, the driver assistance system may comprise a mobile data transmission device. The mobile data transmission device can be in communication with the data cloud service.

In one or some embodiments, a method for operating a prime mover is disclosed. The method for operating a prime mover, such as a tractor, includes a drivetrain, a tire pressure control system, and a driver assistance system. As discussed above, the drivetrain may comprise any one, any combination, or all of: at least one drive motor; at least one gearbox; at least one power take-off; and at least one ancillary unit. The tire pressure control system includes one or more pneumatic components configured to one or both set or adapt a tire pressure of at least one tire of the agricultural prime mover or at least one attachment adapted to the agricultural prime mover. And, the driver assistance system is configured to control the tire pressure control system, with the driver assistance system comprising an automatic tire pressure controller configured to: access one or both of one or more selectable control strategies or one or more optimization target variables; determine, based on a characteristic curve and the one or both of one or more selectable control strategies or one or more optimization target variables, at least one control aspect of the tire pressure control system; and command the at least one control aspect of the tire pressure control system.

Using the method, the overall system comprising (or consisting of) the prime mover and adapted attachment may be comprehensively improved or optimized on the basis of an adjustment of the tire pressure. Depending on the control strategy (such as efficiency), the tire pressure control system may be controlled in an optimized manner by the automatic tire pressure controller to achieve maximum traction efficiency for currently prevailing traction conditions. To accomplish this, the influential variables of the prime mover and attachment may be recorded and considered that also influence the optimum tire pressure. Advantageously, the automatic tire pressure controller may consider variations of efficiencies and/or varying operating behavior of the components of the prime mover, attachment and changes in the environmental conditions that occur in operating practice. In particular, the automatic tire pressure controller may consider variations of efficiencies, which may occur in practice and/or operating behavior of the chassis of the prime mover.

The method for operating the prime mover may have some or all of the features described in conjunction with the agricultural prime mover and the driver assistance system individually or in combination.

Figure 2:
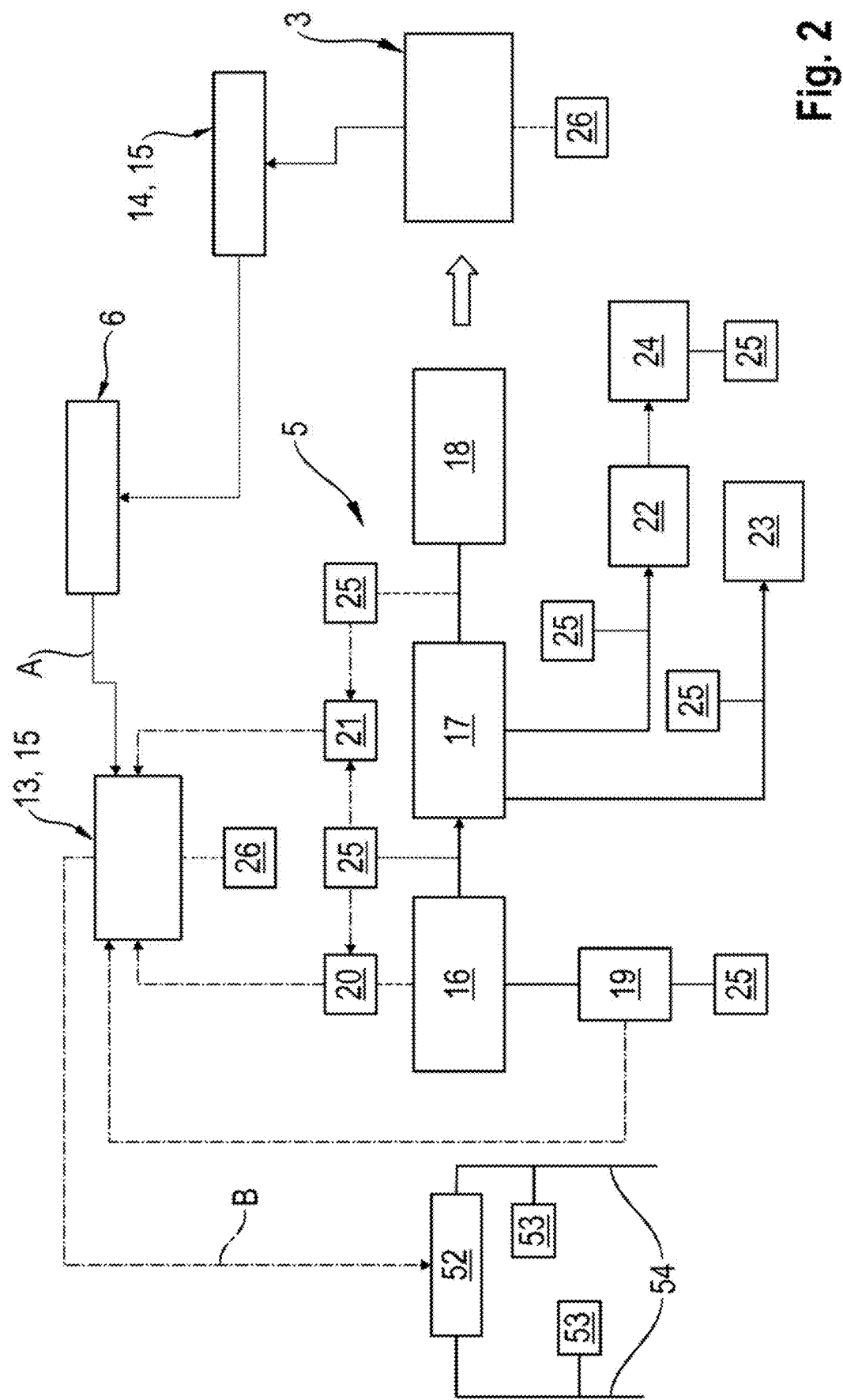
FIG. 2 shows a schematic representation of a drivetrain of the agricultural prime mover.

Referring to the figures, the agricultural machine assembly shown in FIG. 1 comprises a prime mover 1, which may comprise a tractor 2, and at least one attachment 3 adapted for attachment to the prime mover 1. Various attachments are contemplated. As one example, the attachment 3 as disclosed in FIG. 1 is designed as a tillage machine 4 (e.g., a so-called grubber). Thus, the attachment 3 may be designed as any desired attachment, such as, for example, a transport trailer, loading vehicle, windrow, tedder, mower, baler, other tillage machine such as a plow, sprayer, or manure spreader. The prime mover 1 comprises a drivetrain 5 that is schematically represented in FIG. 2. Moreover, in one or some embodiments, the prime mover 1 comprises at least two axles, a front axle 48 and a rear axle 49, on which tires 50, 51 are arranged as soil engagement means on front wheels and rear wheels. Moreover, a tire pressure control system 52, not shown in greater detail, is equipped with one or more control mechanisms to control one or more aspects of the tires. For example, the tire pressure control system 52 may be equipped with pneumatic components for setting and/or adapting a tire pressure $p_1$, $p_2$ of at least one of the tires 50, 51 of the prime mover 1. The pneumatic components of the tire pressure control system 52 are connected to the tires 50, 51 by individual feed lines 54 (including rotary feedthroughs, not shown in greater detail). The tire pressure control system 52, via control commands and/or control machinery, makes it possible to fill and/or vent the tires 50, 51 of the prime mover 1, including while driving.

The prime mover 1 may further include a driver assistance system 6 for controlling the drivetrain 5 and the tire pressure control system 52. In one or some embodiments, the driver assistance system 6 comprises at least one computing unit 7, at least one memory unit 8 and at least one input/output unit 9. The computing unit 7 may comprise any type of computing functionality, such as one or more processors (which may comprise a microprocessor, controller, PLA or the like). The memory unit 8 may comprise any type of storage device (e.g., any type of memory), as discussed further herein. The input/output unit 9 may comprise any type of input and/or output device, and may comprise a single device (e.g., a single device for inputting and outputting information) or may comprise multiple devices. Though computing unit 7 and memory unit 8 are depicted as separate elements, they may be part of a single machine, which includes a microprocessor (or other type of controller) and a memory.

The microprocessor and memory are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry, such as computing unit 7, may store in or access instructions from memory unit 8 for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described herein or illustrated in the drawings.

In one or some embodiments, the computing unit 7 processes information 10 generated from various sources, such as from any one, any combination, or all of machine-internal sensor apparatuses 25, 26 and pressure sensors 53 of the prime mover 1 and/or the attachment 3, external information 11 and information 12 savable in the computing unit 7. The pressure sensors 53 detect the tire pressure $p_1$, $p_2$ of the tires 50, 51 cyclically or periodically and transmit the data generated by the pressure sensors to the driver assistance system 6. The information 10 generated by the machine-internal sensor apparatuses 25, 26 contains environmental parameters 10a which may include inter alia any one, any combination, or all of: the soil nature; soil type; soil state; soil moisture; topography; or weather. The environmental parameters 10a may also be partially available as external information or external environmental parameters 11a which in particular can apply to the weather or topographical data.

Moreover, the prime mover 1 and the attachment 3 may be assigned one or more control devices 13, 14 for controlling and regulating the prime mover 1 and/or the particular attachment 3. In one or some embodiments, the prime mover 1 and the attachment 3 may be assigned either separate control devices 13, 14 for controlling, or a joint control unit 15. The common control unit 15 may then either be positioned on the prime mover 1 or the attachment 3 or be designed portable so that the common control unit 15 may be carried by an operator of the prime mover 1. In one or some embodiments, only the input/output unit 9 may also be designed portable so that the input/output unit 9 may be carried by the operator of the prime mover 1. Remote operation of the driver assistance system 6 by remote access is also contemplated. The driver assistance system 6 may also be designed based on a data cloud in that data are retrievably and editably saved at least partially on an external, spatially remote memory device of an external server, or on an external computing unit 29 instead of on the memory unit 8. The external computing unit 29 may be part of a data cloud service that can be operated by a third-party provider.

In one or some embodiments, the driver assistance system 6 comprises an automatic tire pressure controller 27 that operates based on a characteristic curve and effectuates optimization of the setting of the tire pressure $p_1$, $p_2$ of the tires 50, 51 of the prime mover 1. In the simplest case, this is effectuated in that the automatic tire pressure controller 27 generates control signals A that are supplied to at least the control device 13 or the control unit of the prime mover 1 and effectuate the control of the tire pressure control system 52 of the prime mover 1 thereby generating corresponding control signals B.

FIG. 2 schematically portrays the drivetrain 5 of the prime mover 1. In one or some embodiments, the drivetrain 5 comprises at least one drive motor 16, a gearbox 17, at least one power take-off 18 and the at least one ancillary unit 19. The drive motor 16 may be designed as an internal combustion engine. The drive motor 16 may be controlled by an engine control unit 20. In one or some embodiments, the gearbox 17 is designed as a power shift gearbox or continuously variable gearbox. The gearbox 17 is controlled by a gearbox control unit 21. The at least one power take-off 18 may be designed as a power take-off shaft that serves to drive the attachment 3. The at least one ancillary unit 19 may be designed as an engine fan that is part of a cooling device of the drive motor 16. Moreover, the drivetrain 5 may have a hydraulic drivetrain 22 and/or an electric drivetrain 23. In this case, for example a hydraulic pump and a hydraulic motor or a generator as well as an electric motor may form other ancillary units 19 of the drivetrain 5. The hydraulic drivetrain 22 may serve, for example, to operate a lifter 24 with which the attachment 3 is adapted to the prime mover 1.

Sensor apparatuses 25 may be assigned to the drivetrain 5 and may be configured to determine operating parameters of the drivetrain 5, or respectively its different components. The sensor apparatuses 25 may, for example, be any one, any combination, or all of a rotational speed sensor, a torque sensor, a pressure sensor, or a force sensor. The sensor apparatuses 25 may be configured to determine operating parameters of the drivetrain 5 and may be assigned directly to the drivetrain 5. Moreover, additional sensor apparatuses 26 may be assigned to the prime mover 1 and/or the attachment 3 that are configured to determine specific operating parameters of the prime mover 1 and/or the attachment 3 that also may be determined independent of the drivetrain 5. One of the additional sensor apparatuses 26 may, for example, be any one, any combination, or all of a speed sensor, a tilt sensor, an optical sensor, or a positioning sensor. Moreover, at least one of the additional sensor apparatuses 26 can be configured to receive and/or to determine satellite-based or satellite-supported information such as geodata or vegetation data, which may be external information 11 as well as information 12 saved in the computing unit 7, such as any one, any combination, or all of topographical data, route planning data and the like. Moreover, at least one of the additional sensor apparatuses 26 may be configured to determine data that enable a conclusion to be made about the nature of the soil or subsurface on which the prime mover 1 is moved.

Any one, any combination, or all of the sensor apparatuses 25 of the drivetrain 5, the other sensor apparatuses 26, or pressure sensors 53 of the prime mover 1 and/or the attachment 3 may transmit the generated information 10 indirectly or directly to the driver assistance system 6. In one or some embodiments, the computing unit 7 is configured to evaluate the information 10. The communication between any one, any combination, or all of the engine control unit 20, the gearbox control unit 21, the sensor apparatuses 25, 26, the separate control devices 13, 14, the control unit 15 or the driver assistance system 6 may be done via different communication paths such as, for example, a bus system of the prime mover 1 or the attachment 3, and/or a wireless communication system.

The tire pressure control system 52 and/or the driver assistance system 6 may form the automatic tire pressure controller 27. In this case, the driver assistance system 6 may comprise a set of rules 28 assigned to the automatic tire pressure controller 27 that effectuates optimization of the performance of the prime mover 1 by an optimized controlling of the tire pressure control system 52. The automatic tire pressure controller 27 that operates based on a characteristic curve may be configured for optimized controlling of the tire pressure control system 52 depending on the selectable control strategies 30 and/or optimization target variable(s) 33 (such as optimization target strategy(ies)) saved in the memory unit 8. Accordingly, the overall system, or respectively the machine assembly comprising (or consisting of) the prime mover 1 and attachment 3, may be entirely optimized based on the setting of the tire pressure $p_1$, $p_2$ and not (as done previously) solely based on the partial knowledge of an operator 39 of the operating behavior of the tires 50, 51 at different tire pressures $p_1$, $p_2$. In one or some embodiments, the automatic tire pressure controller 27 is configured to automatically ascertain the tire pressure $p_1$, $p_2$ that leads to maximum traction efficiency under currently prevailing traction conditions and to consider the selected control strategy 30 and/or optimization target variable(s) 33.

Moreover, it is contemplated that the set of rules 28 for optimizing the controlling of the tire pressure control system 52 may be saved in the control device 13 assigned to the prime mover 1 and may be designed as a job computer. Moreover, it is contemplated that the required set of rules 28 may also be saved centrally on an external computing unit 29, which will not be explained in greater detail, or any other backend system, such as based on a data cloud, and may be retrieved by, for example, a bidirectional communication link between the prime mover 1 and the computing unit 29.

Figure 3:
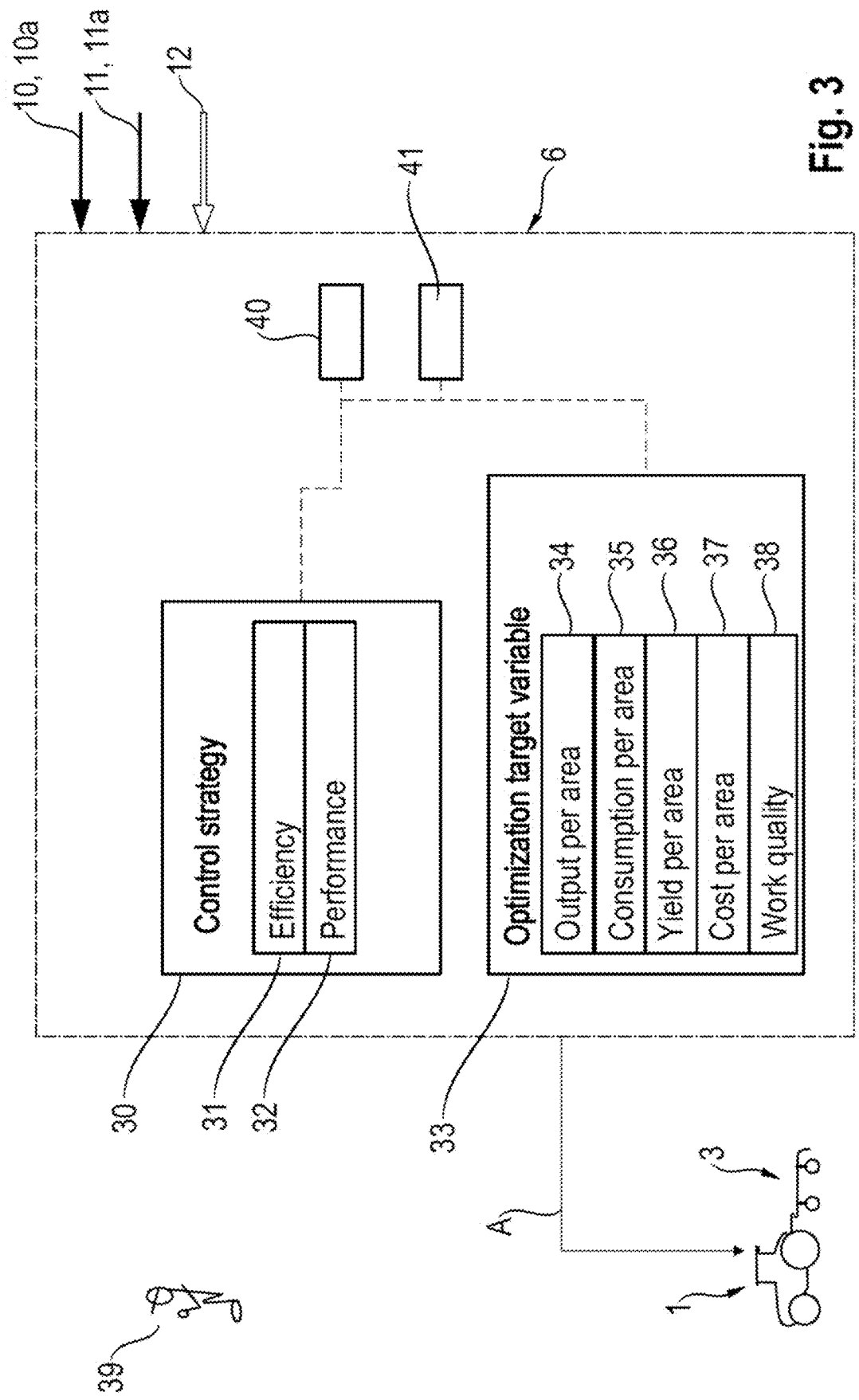
FIG. 3 shows a detailed view of a driver assistance system of the agricultural prime mover.

The depiction in FIG. 3 shows a detailed view of the driver assistance system 6 of the prime mover 1, or respectively the tractor 2, wherein the visualization, operational and structural aspects are combined in one in the same depiction. In one or some embodiments, to optimize the performance of the tire pressure control system 52 of the prime mover 1, the driver assistance system 6 comprises selectable control strategies 30, wherein the selectable control strategies 30 may be prime mover-specific strategies, attachment-specific strategies, and/or a combination of both. Taking into account the adapted attachment 3, efficient optimization of the controlling of the tire pressure control system 52 of the prime mover 1 results when the selectable control strategies 30 comprise at least one of the control strategies of "efficiency" 31 and "performance" 32. With the control strategy of "efficiency" 31, an optimization of the fuel consumption per unit of area is performed by a wheel and/or axle-specific variation of the interior tire pressure $p_1$, $p_2$ of the tires 50, 51, e.g., operating the prime mover 1 and the attachment 3 adapted thereto within a range of the minimum possible fuel consumption. With the control strategy of "performance" 32, an optimization of the output per area is performed by a wheel and/or axle-specific variation of the tire pressure $p_1$, $p_2$ of the tires 50, 51.

Moreover, the driver assistance system 6 may be configured to optimize the mode of operation of the prime mover 1 by the optimized controlling of the tire pressure control system 52 via selectable optimization target variables 33. In particular, the optimization target variables 33 may be selected by an operator 39 alternatively or in addition to the control strategies 30.

The driver assistance system 6 may also be configured such that the driver assistance system 6 may either be operated in a dialog mode 40 with the operator 39 or in an automatic mode 41. In both cases, communication, such as the dialog with the operator 39, may be in natural language.

The optimization target variables 33 may be any one, any combination, or all of the "output per area" 34, "consumption per area" 35, "yield per area" 36, "cost per area" 37, or "work quality" 38. The optimization target variable 33 of "performance per area" 34 may, for example, primarily concern the increase of the worked area and/or processed bulk of agricultural goods per unit time (ha/h). The optimization target variable 33 of "consumption per area" 35 seeks to minimize the fuel consumption per unit area (1/ha). The optimization target variable 33 of "yield per area" 36 seeks to maximize the yield. The optimization target variable 33 of "cost per area" 37 may, for example, primarily include accruing personnel costs, fuel costs, wear costs, operating hours, etc. The optimization target variable 33 of "work quality" 38 prioritizes, for example, the admixture of crop residue, crumbling, reconsolidation, feed quality, etc. in controlling the tire pressure control system 52.

In one or some embodiments, the tire pressure control system 52 and the driver assistance system 6 form the automatic tire pressure controller 27 in that the computing unit 7 of the driver assistance system 6 is configured to autonomously determine or ascertain operating parameters of any one, any combination, or all of the drivetrain 5, the prime mover 1, the attachment 3 or environmental parameters 10*a* from currently prevailing environmental conditions in order to implement the selected control strategy 30 and/or optimization target variable 33, and to specify them to the tire pressure control system 52. This may be performed by transmitting the control signals A to the control device 13 or control unit 15 that then transmits a corresponding control signal B to the tire pressure control system 52.

In one or some embodiments, the automatic tire pressure controller 27 is configured to optimize control of the tire pressure control system 52 depending on the selectable control strategies 30 and/or optimization strategies 33 saved in the memory unit 8. In one or some embodiments, the automatic tire pressure controller 27 of the driver assistance system 6 works based on a characteristic curve. In this regard, at least one n-dimensional characteristic map 42 is saved in the memory unit 8 that will be further explained with reference to the depiction according to FIG. 4. The at least one n-dimensional characteristic map 42 may be part of the set of rules 28. In this regard, the automatic tire pressure controller 27 may vary the tire pressure $p_1$, $p_2$ of the tires 50, 51 for a specific wheel and/or axle, and in so doing optimize the "consumption per area" 35 (e.g., fuel consumption per area (1/ha)), and/or the "output per area" 34 (e.g., worked area per hour (ha/h)) by the tire pressure $p_1$, $p_2$ taking into account the ascertained operating parameters and environmental parameters 10*a*.

Figure 4:
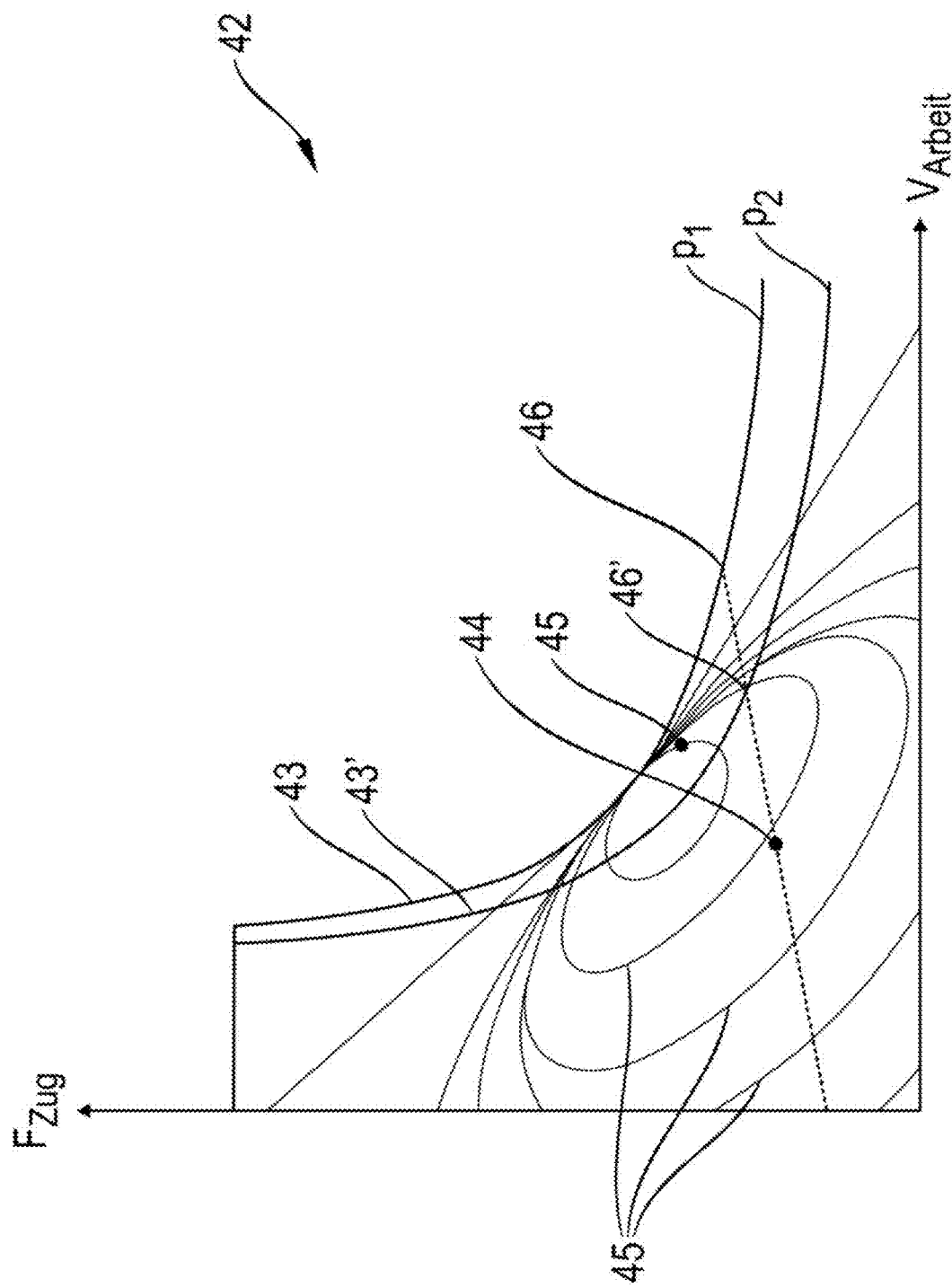
FIG. 4 shows an example of an n-dimensional characteristic map for controlling a tire pressure control system of the agricultural prime mover.

FIG. 4 shows an example of an n-dimensional characteristic map 42 for controlling the tire pressure control system 52. A functional model of the prime mover 1 and the attachment 3 may be saved in the memory unit 8 and may depict at least part of the functional relationships of the prime mover 1 and the adapted attachment 3. Also, in one or some embodiments, at least part or all of the functional relationships of the prime mover 1 and adapted attachment 3 may be represented as pure black box models that, for example, are based on artificial intelligence (AI) or neural networks or mixed forms. The at least one n-dimensional characteristic map 42 may be assigned to the operating parameter of tire pressure $p_1$, $p_2$ to depict the functional relationships of the prime mover 1 and the attachment 3, wherein the tire pressure $p_1$, $p_2$ is defined as the output variable of the at least one n-dimensional characteristic map 42.

The working speed $v_{Arbeit}$ is plotted against the tractive force $F_{Zug}$ as input variables in the characteristic map 42. The output variable forms the tire pressure $p_1$, $p_2$. Reference signs 43, 43' identify the tractive force characteristic curve of the prime mover 1 at different tire pressures $p_1$, $p_2$, and reference sign 44 identifies the tractive force characteristic curve of the attachment 3 that are depicted in the characteristic field 42 as examples. Moreover, lines 45 are shown in the background as constant specific fuel consumption in the form of so-called "shell curves". The particular intersection of the tractive force characteristic curve 44 of the attachment 3 with the tractive force characteristic curve 43 and 43' of the prime mover 1 defines an operating point 46 and 46' that results at full load with different adjustments of the tire pressure $p_1$, $p_2$. The lines 45 of constant specific fuel consumption may be calculated for a specific operating state given a known configuration of the drivetrain 5. A specific operating state may be established by operating parameters of the prime mover 1, such as any one, any combination, or all of the drivetrain 5, the at least one ancillary unit 19 of the drivetrain 5, the attachment 3 or environmental parameters 10*a*, 11*a* resulting from the environmental conditions which include inter alia any one, any combination, or all of the soil nature, soil type, soil state, soil moisture, topography, and weather. Any one, any combination, or all of the operating parameters of the drivetrain 5, the at least one ancillary unit 19, the attachment 3, the hydraulic drivetrain 22, the electric drivetrain 23, or environmental parameters 10*a*, 11*a* determined using the currently prevailing environmental conditions may form the parameters to be taken into account for the optimized control of the tire pressure control system 52, and hence to optimally set the particular tire pressure $p_1$, $p_2$.

Changing the tire pressures $p_1$, $p_2$ has an influence on the placement of the tractive force characteristic curve 43, 43' in the characteristic map 42, and hence on the transmitted output. The lines of constant specific fuel consumption can be calculated for an operating state given a known configuration of the drivetrain. Relevant operating states may be defined in one embodiment for example by any one, any combination, or all of: different motor droop; different tire pressures; different control of an ancillary unit 19; output power of the drive motor 16; output power of the gearbox 17 or gearbox load; drive power of an ancillary unit determined from the difference between the motor output power and the output power of the gearbox taking into account the characteristic map of the gearbox efficiency; power flow in the power take-off; power flow in the hydraulic drivetrain 22; power flow in the electrical drivetrain 23; lift position of the lifter 24/working depth of the attachment 3; slip; signals from the tractive force measuring pin of the lifter 24; or tilt angle of the tractor.

The operating parameters of the drivetrain 5 comprise inter alia any one, any combination, or all of the output power of the at least one drive motor 16, the output power of the gearbox 17 or the gearbox load, the drive power of the at least one ancillary unit 19, the at least one power take-off 18, the slip, the motor rotational speed, the driving speed, the gearbox ratio, the status of the all-wheel drive and/or differential lock, or the power flow in the drivetrain of the power take-off 18, in the hydraulic drivetrain 22, or in the electric drivetrain 23. Accordingly, for example, the drive power of at least one ancillary unit 19 may be determined from the difference between the output power of the drive motor 16 and the output power of the gearbox 17 taking into account the characteristic map of the gearbox efficiency.

Other operating parameters of the prime mover 1 may be inter alia any one, any combination, or all of a tilt angle of the prime mover 1 in the transverse and longitudinal direction, the weight of the prime mover 1, ballast, tire size and tire type of the tires 50, 51 on the axles 48, 49, axle loads, wheel forces, wheel torques and traction parameters that are sensed by one of the sensor apparatuses 25, 26, or may be calculated from data detected by the sensor apparatuses 25, 26, or otherwise received or saved data.

Moreover, the operating parameters of the attachment 3 may comprise any one, any combination, or all of the nature and/or type of attachment 3, the working width, the lift position, the working depth, and other setting parameters of the attachment 3, such as the front furrow width, traction point, contact pressure and the like.

The environmental parameters 10*a*, 11*a* may form inter alia any one, any combination, or all of the soil nature, soil type, soil state, soil moisture, the topography, the weather, or the like.

With the control strategy of "efficiency", an optimization of fuel consumption per unit area is carried out, wherein the operating point 46, 46' in the n-dimensional characteristic map 42 lies near the least possible fuel consumption, taking into account the operating parameters and environmental parameters 10*a*. With the control strategy of "performance", an optimization of output per area is performed, wherein the operating point 46, 46' in the n-dimensional characteristic map 42 lies near the maximum engine output, taking into account the operating parameters and environmental parameters 10*a*. In so doing, the tire pressures $p_1$, $p_2$ are varied by controlling the tire pressure control system 52 corresponding to the particular control strategy.

According to the characteristic map 42 shown as an example in FIG. 4, the optimization target variable of "consumption per area" is optimized by the automatic tire pressure controller 27 such that the tire pressure $p_1$ is changed to tire pressure $p_2$ so that an operating point 46' is adjusted that lies on the characteristic curve 44 of the required tractive force of the attachment 3 at full load close to the point of the minimum possible specific fuel consumption in the characteristic map 42.

The computing unit 7 may match the at least one n-dimensional characteristic map 42 during operation, such as cyclically or periodically, with the conditions of use of the prime mover 1. In this case, at least one n-dimensional initial characteristic map 42' may be saved in the memory unit 8. Accordingly, the computing unit 7 of the driver assistance system 6 may perform the determination of the first determination of the tire pressure $p_1$, $p_2$ based on the initial characteristic map 42'.

Moreover, the computing unit 7 may be configured to adapt the form of the initial characteristic map 42' to existing conditions of use by using measured operating parameters and environmental parameters 10*a*, or approaching sampling points in the initial characteristic map 42'. Starting from the initial characteristic map 42', the form of the characteristic map 42 may be adapted to the current conditions of use by adjusting predefined operating points that represent sampling points in the characteristic map 42. In this regard in a first step, rated values or respectively operating parameters as well as environmental parameters 10*a* may be acquired using the particular sensor apparatuses 25, 26, 53, and received as external information 11 and preprocessed by the computing unit 7. If the rated values such as rotational speeds, forces, slip and the driving speed are more or less stationary, they may be entered into the n-dimensional initial characteristic map 42'. If individual rated values determined by the sensor apparatuses 25, 26 are missing in the n-dimensional space of the initial characteristic map 42' because they do not occur during regular field travel or road travel, or are only insufficiently present since they are not approached during standard operation of the prime mover 1, specific sampling points may be actively approached instead. The second step may include the testing and/or adapting of the functional model of the prime mover 1 and attachment 3 based on changes in the current conditions of use that are in turn determined by the operating parameters as well as environmental parameters 10*a*.

The depiction in FIG. 5 shows an example of an n-dimensional initial characteristic map 42' that is adapted as an example based on a change to at least one operating parameter in the drivetrain 5. The operating parameter is, for example, the rotational speed of the ancillary unit 19 designed as an engine fan which rises during operation depending on the load on the drive motor 16, as illustrated in FIG. 5 by the arrow 47. The increase 47 in the rotational speed of the engine fan leads to adapting the initial characteristic map 42' to characteristic map 42, or adapted characteristic map 42".

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural prime mover
2 Tractor
3 Attachment
4 Tillage machine
5 Drivetrain
6 Driver assistance system
7 Computing unit
8 Memory unit
9 Input/output unit
10 Information
10*a* Environmental parameter
11 External information
11*a* External environmental parameter
12 Information
13 Control device
14 Control device
15 Control unit
16 Drive motor
17 Gearbox
18 Power take-off
19 Ancillary unit
20 Engine control unit
21 Gearbox control unit
22 Hydraulic drivetrain
23 Electric drivetrain
24 Lifter
25 Sensor apparatus
26 Sensor apparatus
27 Automatic tire pressure controller
28 List of rules
29 External computing unit
30 Control strategy
31 Efficiency
32 Performance
33 Optimization target variable
34 Output per area
35 Consumption per area
36 Yield per area
37 Cost per area
38 Work quality
39 Operator
40 Dialog mode
41 Automatic mode
42 Characteristic map
42' Initial characteristic map
42" Adapted characteristic map
43 Tractive force characteristic curve at $p_1$ 43' Tractive force characteristic curve at $p_2$
44 Tractive force characteristic curve of 3, 4
45 Line of constant fuel consumption
46 Operating point
46' Operating point
47 Arrow
48 Front axle
49 Rear axle
50 Tires
51 Tires
52 Tire pressure control system
53 Pressure sensor
54 Feedline
$F_{Zug}$ Tractive force of 1
A Control signal
B Control signal
$P_1$ Tire pressure
$P_2$ Tire pressure
$v_{Arbeit}$ Working speed

The invention claimed is:

1. An agricultural prime mover comprising:
a drivetrain, wherein the drivetrain comprises at least one drive motor, at least one gearbox, at least one power take-off, and at least one ancillary unit;
a tire pressure control system comprising one or more pneumatic components configured to one or both set or adapt a tire pressure of at least one tire of the agricultural prime mover or at least one attachment adapted to the agricultural prime mover;
a driver assistance system configured to control the tire pressure control system, the driver assistance system comprising an automatic tire pressure controller configured to:
access one or both of a selected control strategy selected from a plurality of control strategies or an optimization target variable;
determine, based on a characteristic curve and the one or both of the selected control strategy or the optimization target variable, at least one control aspect of the tire pressure control system;
generate one or more control signals in order to control the at least one control aspect of the tire pressure control system; and
command the tire pressure control system using the one or more control signals in order to control the at least one control aspect of the tire pressure control system.

2. The agricultural prime mover of claim 1, wherein the agricultural prime mover comprises a tractor; and
wherein the tire pressure control system and the driver assistance system comprise an automatic tire pressure controller configured to autonomously ascertain one or more parameters that influence tire pressure to be set in order to implement the one or both of the selected control strategy or the optimization target variable, and to specify the one or more parameters to the tire pressure control system.

3. The agricultural prime mover of claim 2, wherein the plurality of control strategies comprise efficiency and performance; and
wherein the optimization target variable is selected from any one, any combination, or all of output per area, consumption per area, yield per area, cost per area, or work quality.

4. The agricultural prime mover of claim 1, wherein the automatic tire pressure controller is configured to optimize traction efficiency of the agricultural prime mover depending on the one or both of the selected control strategy or the optimization target variable.

5. The agricultural prime mover of claim 1, wherein the automatic tire pressure controller is configured to optimize tire pressure for any one, any combination, or all of a specific wheel, an axle, or overall.

6. The agricultural prime mover of claim 1, wherein parameters considered for optimized controlling of the tire pressure control system are any one of operating parameters of the agricultural prime mover, operating parameters of the drivetrain, operating parameters of the attachment, or environmental parameters resulting from environmental conditions.

7. The agricultural prime mover of claim 6, further comprising one or more sensor apparatuses positioned on the agricultural prime mover and configured to generate sensor data indicative of one or both of the operating parameters of the agricultural prime mover or the environmental parameters; and
wherein the driver assistance system is configured to determine the at least one control aspect of the tire pressure control system based on the sensor data indicative of the one or both of the operating parameters of the agricultural prime mover or the environmental parameters.

8. The agricultural prime mover of claim 7, wherein the operating parameters of the agricultural prime mover include any one, any combination, or all of output power of the at least one drive motor, output power of the gearbox or gearbox load, drive power of the at least one ancillary unit or the at least one power take-off, slip, driving speed, gearbox ratio, power flow in a hydraulic drivetrain, attachment type or setting parameters of the attachment; and
wherein the driver assistance system is configured to determine the at least one control aspect of the tire pressure control system based on any one, any combination, or all of the output power of the at least one drive motor, the output power of the gearbox or gearbox load, the drive power of the at least one ancillary unit or the at least one power take-off, the slip, the driving speed, the gearbox ratio, the power flow in the hydraulic drivetrain, the attachment type or the setting parameters of the attachment.

9. The agricultural prime mover of claim 1, wherein the at least one control aspect of the tire pressure control system comprises tire pressure;
wherein at least one n-dimensional characteristic map is assigned to an operating parameter of the tire pressure to depict functional relationships of the agricultural prime mover; and
wherein the tire pressure is defined as an output variable of the at least one n-dimensional characteristic map.

10. The agricultural prime mover of claim 9, wherein at least one or more operating parameters of the agricultural prime mover, the attachment, or environmental parameters resulting from environmental conditions are input variables to the at least one n-dimensional characteristic map.

11. The agricultural prime mover of claim 10, wherein the agricultural prime mover is configured to select the at least one n-dimensional characteristic map depending on the one or both of the selected control strategy or the optimization target variable in order for the selected at least one n-dimensional characteristic map to output the tire pressure.

12. The agricultural prime mover of claim 11, wherein the agricultural prime mover is configured to match the at least one n-dimensional characteristic map during ongoing operation with conditions of use of the agricultural prime mover such that at least one n-dimensional initial characteristic map is saved in memory, and during initial determination of the tire pressure, the agricultural prime mover is configured to perform the initial determination of the tire pressure based on the initial characteristic map; and wherein the agricultural prime mover is configured to adapt the initial characteristic map to existing conditions of use by using measured operating parameters of the agricultural prime mover or by sampling points in the initial characteristic map.

13. A method for operating an agricultural prime mover, the method comprising:

using the agricultural prime mover with a drivetrain, a tire pressure control system equipped with pneumatic components for setting and adapting a tire pressure of at least one tire of the agricultural prime mover and at least one attachment adapted to the agricultural prime mover, wherein the drivetrain comprises at least one drive motor, a gearbox, at least one power take-off, and at least one ancillary unit;

access one or both of a selected control strategy selected from a plurality of control strategies or an optimization target variable;

determine, based on a characteristic curve and the one or both of the selected control strategy or the optimization target variable, at least one control aspect of the tire pressure control system;

generating one or more control signals in order to control the at least one control aspect of the tire pressure control system; and command the tire pressure control system using the one or more control signals in order to control the at least one control aspect of the tire pressure control system.

14. The method of claim 13, wherein the at least one control aspect of the tire pressure control system comprises tire pressure;

wherein at least one n-dimensional characteristic map is assigned to an operating parameter of the tire pressure to depict functional relationships of the agricultural prime mover; and wherein the tire pressure is defined as an output variable of the at least one n-dimensional characteristic map.

15. The method of claim 14, further comprising matching the at least one n-dimensional characteristic map during ongoing operation with conditions of use of the agricultural prime mover such that at least one n-dimensional initial characteristic map is saved in memory, and during initial determination of the tire pressure, the agricultural prime mover performs the initial determination of the tire pressure based on the initial characteristic map.

16. The agricultural prime mover of claim 7, wherein the one or more sensor apparatuses comprise a tilt sensor configured to detect tilt in one or both of a longitudinal direction or a transverse direction; and wherein the driver assistance system is configured to determine the at least one control aspect of the tire pressure control system based on the tilt in the one or both of the longitudinal direction or the transverse direction.

17. The agricultural prime mover of claim 1, wherein the driver assistance system is configured to access one or more of soil nature, soil type, soil state, or soil moisture; and wherein the driver assistance system is configured to determine the at least one control aspect of the tire pressure control system based on the one or more of the soil nature, the soil type, the soil state, or the soil moisture.

18. The agricultural prime mover of claim 2, wherein responsive to the selected control strategy comprising efficiency, the driver assistance system is configured to control an automatic tire pressure controller to automatically ascertain tire pressure for maximum traction efficiency for one or more current traction conditions.

19. The agricultural prime mover of claim 18, wherein the drivetrain comprises a chassis; and wherein the driver assistance system is further configured to automatically ascertain the tire pressure based on operating behavior of the chassis.

20. The agricultural prime mover of claim 1, wherein the driver assistance system is configured to determine whether the agricultural prime mover is traveling on a road or on a field;

responsive to determining that the agricultural prime mover is traveling on the road, the driver assistance system is configured to:

access a first tire pressure value; and control the tire pressure, using the tire pressure control system, with the first tire pressure value; and responsive to determining that the agricultural prime mover is traveling on the field, the driver assistance system is configured to:

access a second tire pressure value; and control the tire pressure, using the tire pressure control system, with the second tire pressure value.

\* \* \* \* \*